(12) United States Patent
Yasukawa et al.

(10) Patent No.: US 6,698,282 B2
(45) Date of Patent: Mar. 2, 2004

(54) HEATED TYPE AIR FLOW RATE SENSOR AND ITS FORMING METHOD

(75) Inventors: Akio Yasukawa, Kashiwa (JP); Rintaro Minamitani, Tsukuba (JP); Shinya Igarashi, Naka (JP); Masamichi Yamada, Hitachinaka (JP); Akira Koide, Azuma (JP)

(73) Assignees: Hitachi, Ltd., Tokyo (JP); Hitachi Car Engineering Co., Ltd., Hitachinaka ( * ) Notice: Subject to any disclaimer, the term of this patent is extended or adjusted under 35 U.S.C. 154(b) by 0 days.

(21) Appl. No.: 09/811,439

(22) Filed: Mar. 20, 2001

(65) Prior Publication Data

US 2002/0023487 A1 Feb. 28, 2002

(30) Foreign Application Priority Data

Aug. 30, 2000 (JP) ........................................ 2000-260109

(51) Int. Cl.$^7$ ................................................. G01F 1/68
(52) U.S. Cl. ................................................... 73/204.26
(58) Field of Search ........................ 73/204.26, 204.23, 73/204.25; 257/167, 467, 470, 414

(56) References Cited

U.S. PATENT DOCUMENTS 5,056,362 A    10/1991   Ang et al.
5,396,795 A  *  3/1995   Araki ...................... 73/204.26

FOREIGN PATENT DOCUMENTS

DE          42 15 722 A1    11/1993
JP          62123318     *   6/1987   .............. 73/204.26

* cited by examiner

*Primary Examiner*—Edward Lefkowitz
*Assistant Examiner*—C Dickens
(74) *Attorney, Agent, or Firm*—Antonelli, Terry, Stout & Kraus, LLP

(57) ABSTRACT

The object of this invention is to provide a heated type air flow rate sensor for measuring an air flow rate using heat generating resistive element or resistor formed within a diaphragm of which periphery is fixed, in which diaphragm destruction due to the collusion of dust is adapted to be prevented.

Tapers of two or more stages are formed at a diaphragm fixing flange, and the angle of the most inside taper is made smaller than the angle of the taper which is outside with respect to the most inside taper.

When dust collides with the diaphragm and the kinetic energy is transformed into distortion energy, the diaphragm destruction is avoided by making small the slope of the load-displacement curve at the neighborhood of the diaphragm flange to make the generated load small.

16 Claims, 6 Drawing Sheets

US 6,698,282 B2

HEATED TYPE AIR FLOW RATE SENSOR AND ITS FORMING METHOD

BACKGROUND OF THE INVENTION

This invention relates to a heated type air flow rate sensor for measuring an air flow rate by using a heating resistor formed in a diaphragm of which the circumference is fixed, and more particularly, a heated type air flow sensor having a structure suitable for measuring the intake pipe pressure of an automobile internal combustion engine.

A prior art heated resistor type sensor utilizes a structure as shown in Japanese Patent Prepublication No. 502966/1991. In this structure, a silicon rim to which p-type doping has been effected is positioned between a silicon substrate having the (100) crystal orientation and a thin dielectric diaphragm and under the highest point of a sandwich structure and a sensing element, and the silicon substrate has a taper formation thereon facing the silicon rim.

In the heated type air flow rate sensor, dust contained in the air, which is the object of measurement, can often destroy the diaphragm when it collides against the diaphragm, whereby it is often the case that the characteristic of the heated type air flow rate sensor deteriorates. The object of this invention is to solve this problem.

Moreover, if an automobile engine controlling apparatus employing the heated type air flow rate sensor of which the characteristic has thus deteriorated is used, its control accuracy decreases, whereby it is often the case that the amount of emission of air pollutant and the amount of consumption of fuel are increased. The object of this invention is to resolve this problem.

SUMMARY OF THE INVENTION

An object of this invention is to provide a heated type air flow rate sensor which prevents it from deterioration of the characteristics due to dust contained in the air, and thereby limits the emission of air pollutants and the amount of consumption of fuel to a small amount.

By forming two or more tapers on a diaphragm fixing flange and making the angle of the furthest inside taper smaller than the angle of a taper on the outside thereof, the destruction of the diaphragm is avoided.

Also, by using Si monocrystal and a $Si_3N_4$ film as materials that make up a fixing portion and the diaphragm, respectively, and by making the angle of the first stage taper below 15 degrees, preferably below 5 degrees, and having the thickness of its root above 12 $\mu$m, the destruction of the diaphragm is avoided.

Also, in a method of forming a heated type air flow rate sensor in which a mask with an opening is formed on the backside of the Si monocrystal substitute having a thin film formed thereabove, the substrate is partially removed by carrying out etching and the thin film diaphragm and a fixing portion for supporting this are formed, etching is carried out using a mask having an opening which is smaller than a final substrate removed portion. Thereafter, the diaphragm and the diaphragm fixing portion are formed by carrying out the etching with the mask opening being expanded, whereby the destruction of the diaphragm is avoided.

Also, by forming an inner taper portion with a resin, a more flexible structure is provided, whereby the destruction of the diaphragm is avoided.

Also, by providing an automobile internal combustion engine controlling apparatus utilizing the heated type air flow rate sensor, using any one of the above-mentioned means, the characteristic deterioration of the air flow meter is prevented, control precision is improved, and the above-mentioned objects are achieved.

DETAILED DESCRIPTION OF THE PREFERRED EMBODIMENTS

Figure 1:
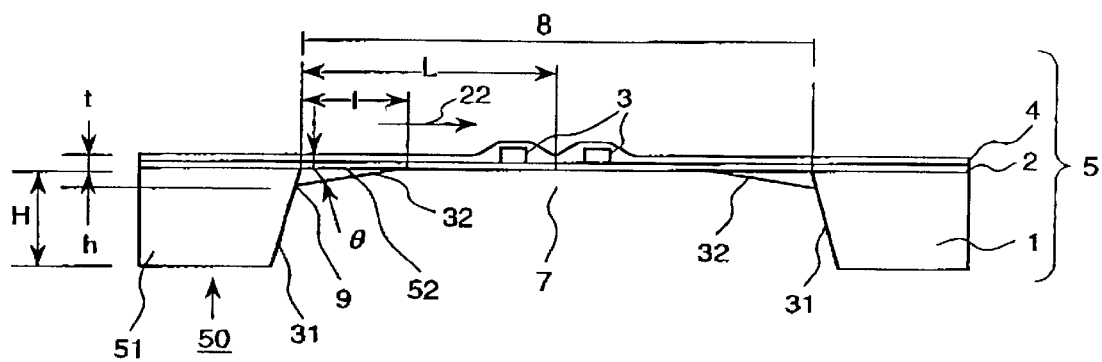
FIG. 1 shows the cross section of a sensor chip of one embodiment of this invention.
Figure 2:
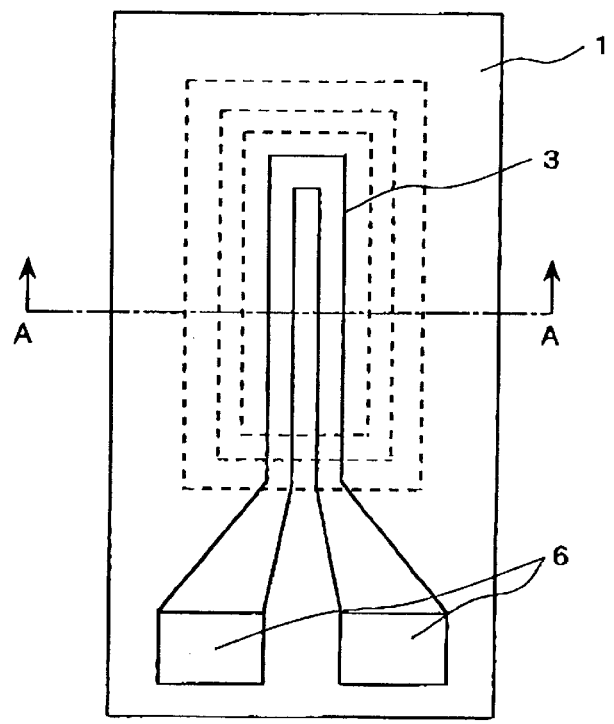
FIG. 2 shows the top view of the sensor chip of one embodiment of this invention.

One embodiment according to this invention will be explained with reference to the attached drawings. FIG. 1 is a front sectional view of a sensor chip of a heated type air flow rate sensor according to the embodiment of this invention. FIG. 2 is a plan view thereof. FIG. 1 shows the section taken along A—A in FIG. 2.

In FIG. 1, above a substrate 1 which is the sensor chip, a lower insulation film 2 is formed. Above this lower insulation film 2, a resistive element 3 is partially formed. Further, above this resistive element, an upper insulation film 4 is formed. These make up a sensor chip 5 in consort with each other. As shown in FIG. 2, the resistive element 3 is in the form of a D-shaped pattern starting from electric poles 6. On the backside of the substrate 1, a depression 7 is partially formed. In this portion, there is the lower insulation film 2, the resistive element 3, and the upper insulation film 4. By these portions, a diaphragm 8 is formed in the form of a thin dielectric body.

Herein, the area between the right and left intersecting points of tapers 31, as described later with the lower insulation film 2, is referred to as a diaphragm region. However, the diaphragm region is not limited to this. In general, the thin dielectric body portion may be called the diaphragm region.

Figure 3:
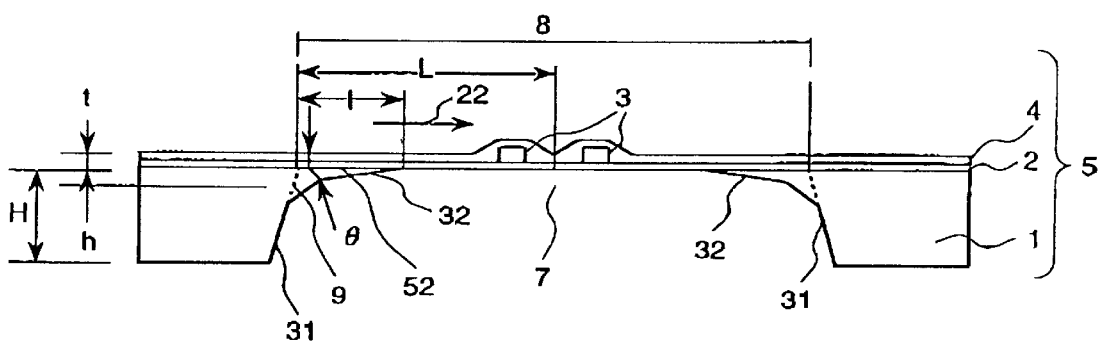
FIG. 3 shows the cross section of a sensor chip of another embodiment of this invention.

This diaphragm 8 is fixed by a diaphragm fixing flange 50. The diaphragm fixing flange 50 is made up a diaphragm fixing portion 51 and a flexible support portion 52. The diaphragm fixing portion 51 and the flexible support portion 52 have a taper 31 and a taper 32, respectively, formed thereon. These tapers provide a two-stage taper configuration. However, it should be appreciated that this invention is not limited to this 2-stage taper configuration. As is shown in FIG. 3, the number of stages may be selected to be greater than two. The angle of the inside taper 32 is made smaller than the angle of the outside taper 31. The diaphragm 8 is fixed to the diaphragm fixing portion 51, and is supported by the flexible support portion 52. The flexible support portion acts as a deformable absorber as well as a collision energy absorber, and it has extremely high flexibility as compared with the diaphragm fixing portion 51.

FIG. 3 shows a sample of modification of the embodiment in FIG. 1. Although in the embodiment in FIG. 1 the diaphragm fixing flange 50 has two tapers, in the sample in FIG. 3 a buckling portion 9 is formed as a rounded buckling portion 10. Other parts are the same as those in FIG. 1, and provide the similar qualities. Hereafter, the example in FIG. 1 will be explained generally.

Figure 4:
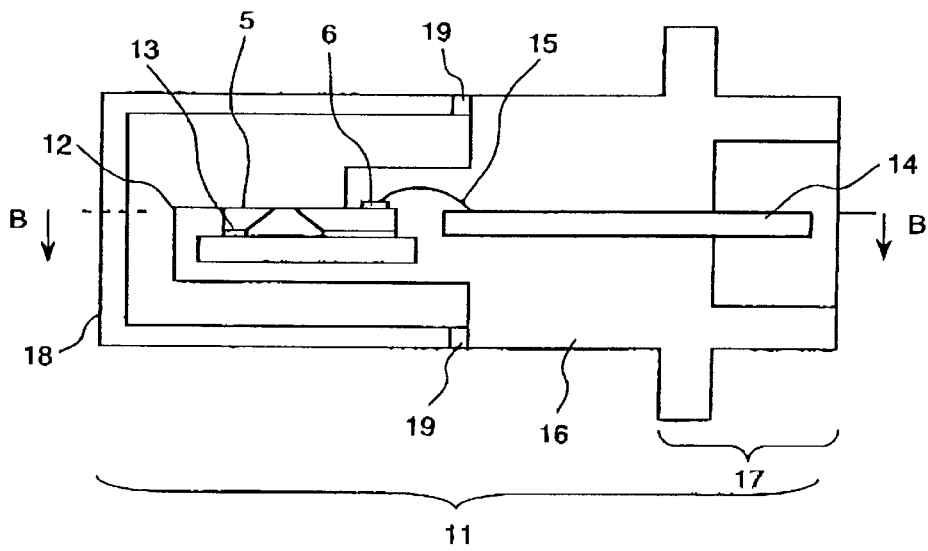
FIG. 4 shows the cross section of a package portion of one embodiment of this invention.
Figure 5:
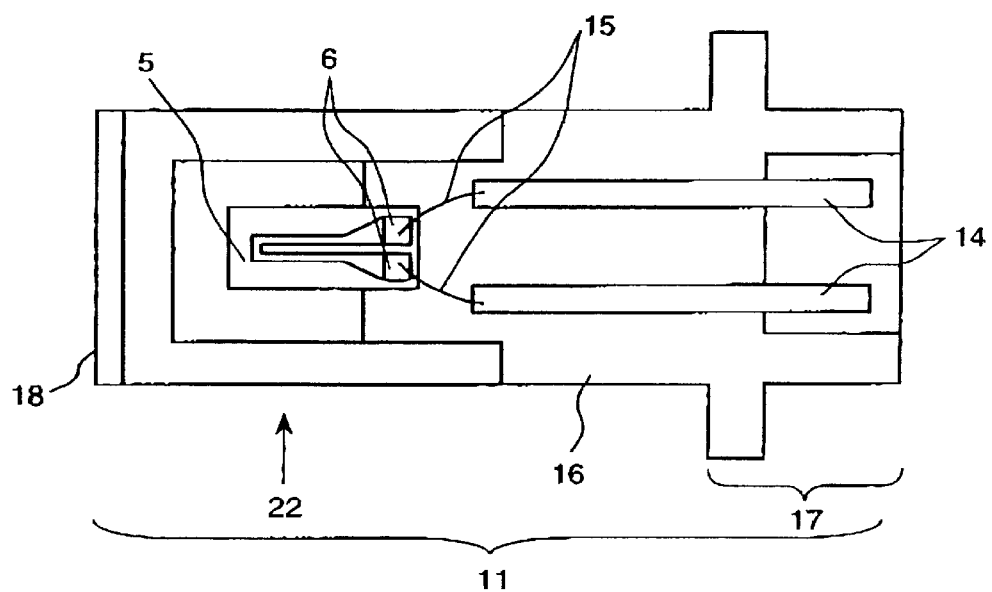
FIG. 5 shows the top view of the package portion of one embodiment of this invention.

Next, a package portion in this embodiment is explained using FIG. 4 and FIG. 5. FIG. 4 is the side sectional view of the package portion. FIG. 5 is the B—B section in FIG. 4.

Figure 6:
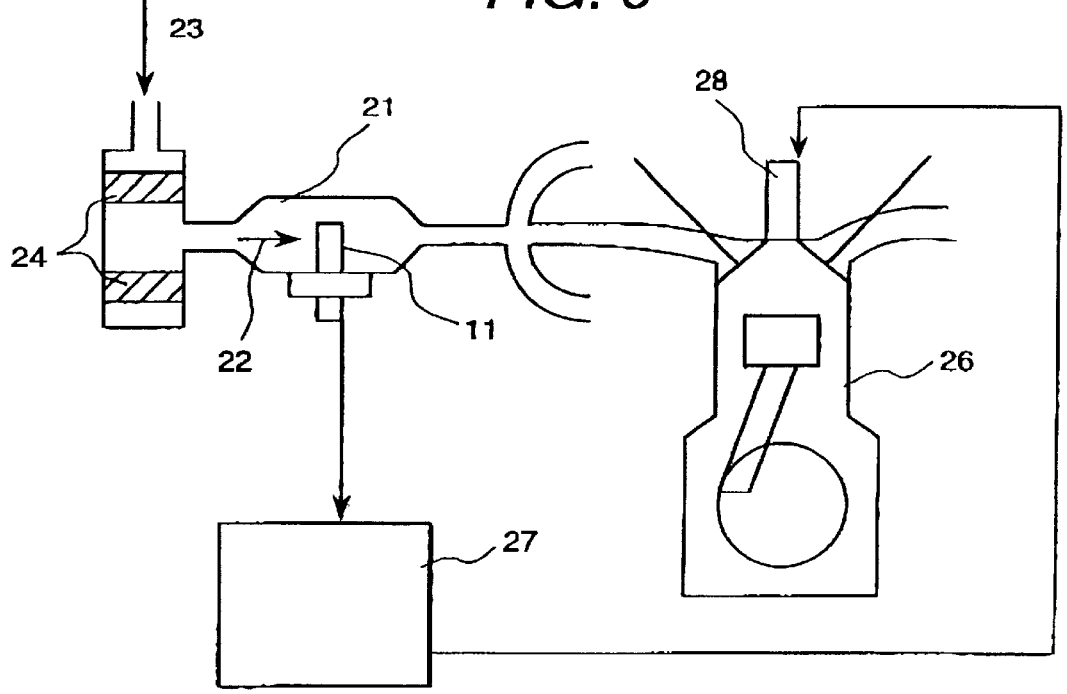
FIG. 6 shows the structure of one embodiment of this invention.

The sensor chip 5 is built in a package 11, as shown in FIG. 4 and FIG. 5. That is, the sensor chip 5 is bonded on a tab 12 by means of an adhesive 13. Wires 15 connect between one lead 15 and one electric pole 6 on the sensor chip 5 and between the other lead 15 and the other electric pole 6, respectively. Furthermore, resin 16 is molded. The sensor chip is built in so that its front face is exposed outside and its side face is covered by the resin, as shown in FIG. 4. By this, it is possible to cause the air, which is the measured object, to flow through the front face of sensor chip 5, and to prevent the sensor chip 5 from peeling off from the resin 16. Also, a connector portion 17 is formed at the same time as the molding of the resin 16. Furthermore, at the head portion of this package 11, a straightening plate 18 is bonded by an adhesive 19, and this package 11 is incorporated within the intake pipe 21 of the engine, as shown in FIG. 6.

In operation, the resistive element in FIG. 1 generates heat due to the fact that an electric current flows through it, and its temperature increases. When air flow 22 occurs within the intake pipe 21 in FIG. 6, air 22 flows toward the front face of the sensor chip 5, whereby it becomes the air flow 22 on the resistive element 3 in FIG. 1. As a result, the resistive element 3 is cooled and the temperature of the resistive element 3 changes. Thus, the resistance value of the resistive element 3 varies depending upon the temperature coefficient of resistance of the material of the resistive element, and by detecting this variation, it is possible to detect the air flow rate.

In FIG. 1, monocrystal silicon is used as the substrate silicon, polycrystalline silicon is used as the resistive element 3, and a composite film comprised of $SiO_2$ and $Si_3N_4$ formed using CVD is used as the insulation films 2 and 4. With this, by yielding the residual stress in slight tensile condition, it is possible to provide the proper flatness maintained to the diaphragm. By this, it is possible to prevent the air flow 22 passing on the diaphragm from becoming a turbulent flow, and thereby ensure high measurement accuracy.

As for the thickness t of the diaphragm 8, if it is thickened, since heat which was generated by the resistive element 3 results in its transmission to the substrate 1, the temperature variation of the resistive element 3 due to the air flow 22 becomes imperceptible. As a result, it becomes impossible to measure the flow rate. Various values in thickness were considered. As a result, it was found that a thickness under 21 $\mu$m is suitable for the measurement. In this embodiment, the thickness of 1.5 $\mu$m was selected, which provides sufficiently high measurement accuracy.

The relationship between the thickness H of the substrate 1 and the efficiency of chip handling was considered. As a result, it was found that a thickness of the substrate which is over 150 $\mu$m is suitable for providing good handling capability. In this embodiment, the value of 200 $\mu$m was utilized.

As explained above, in the heated type air flow rate sensor in which the diaphragm fixing flange for fixing the diaphragm is formed, the heat generating resistor is attached to the diaphragm and the air flow rate is measured using the electric resistance value. Said diaphragm is made thin toward said heat generating resistor in a tapered manner, and it is supported by the flexible support portion integrated with the diaphragm fixing portion in said diaphragm fixing flange.

In FIG. 4, the tab 12 and the leads 14 are made of an Fe—Ni 25 alloy, and the bonds 13 and 19, and the resin 16 are composed of an epoxy material. By this, good boundary-face strength between the tab 12, the leads 14 and the resin 16 is provided, and separation therebetween can be avoided. An epoxy material is used as the material of the straightening plate 18, and, by this, the distortion of the straightening plate 18 can be avoided. An Al material is used as the material of the electric poles 6 and the wires 15, and, by this, high connection strength can be provided.

In FIG. 6, larger particles of dust contained in the air flow 22 are removed by filters 24. However, smaller particles of dust pass through the filters 24 and enter into the intake pipe 21. Such smaller dust particles can often collide with the diaphragm 8 in FIG. 1. Therefore, the matter of necessity is to prevent the damage or destruction of the diaphragm 8 due to such a collision of the dust.

In this embodiment, as shown in FIG. 1, the substrate 1 has at its diaphragm fixing position the two-stage taper pattern in which the thin inside taper 32 is formed on the inside of the thick outside taper 31, and the angle of the inside taper 32 is smaller than the angle of the outside taper 31. With this arrangement, an evaluation test of the capability for resisting dust was carried out. As a result, it was found that diaphragm damage can be prevented.

Figure 9:
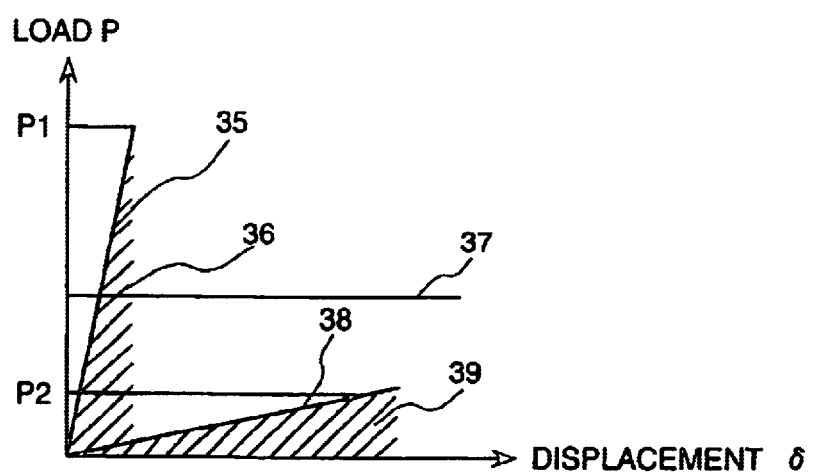
FIG. 9 shows the relationship between the load and displacement at the time of dust collision.

As for the sensors having the prior art structure, an evaluation of the capability for resisting dust was also conducted. As a result, it was found that the inability of the prior art sensors to resist dust induces diaphragm damage. First, the mechanism of the damage in the prior art structure will be explained using FIG. 7 and FIG. 9.

Figure 7:
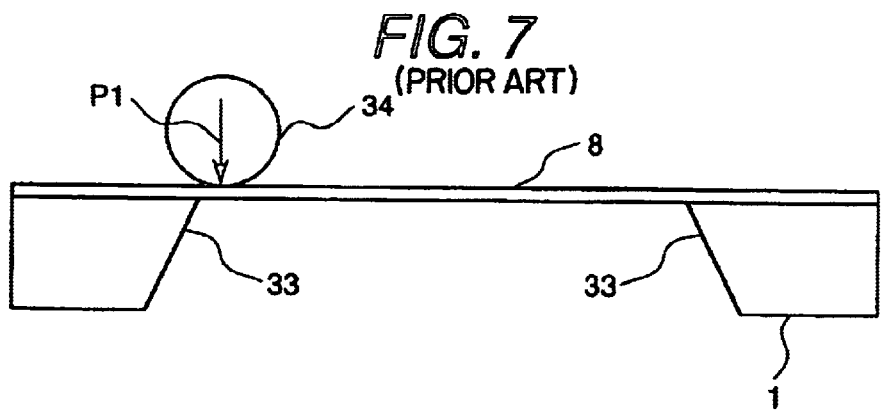
FIG. 7 shows the state in which dust collided with the sensor chip of the prior art device.
Figure 12:
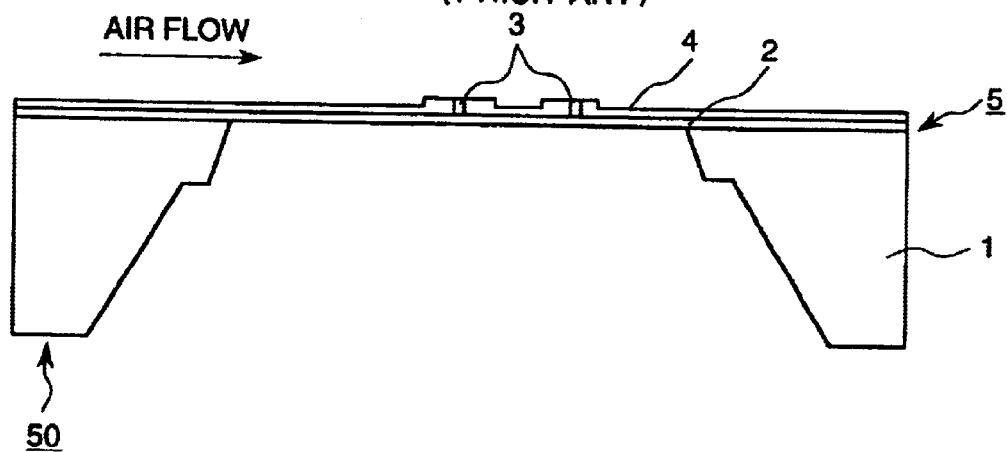
FIG. 12 shows the structure of the prior art sensor chip.

In the prior art structure, as shown in FIG. 7, thediaphragm fixing flange is in the form of a one-stage large angle taper 33, or even though the taper patter is in the form of a multi-stage, as shown in FIG. 12, the taper angle of the inside taper is larger than that of the outside taper. So, as shown in FIG. 7, the ability of deformation absorption at the time when dust 34 collides with the portion of the diaphragm 8 on the immediate inside of the fixing flange thereof is limited. That is, in the prior art structure, the diaphragm support is a rigid structure which does not take into consideration the damage of the diaphragm due to the collision with the dust. As a result, the load P1 applied to the diaphragm 8 becomes a large value, as shown by 35 in FIG. 9. This is because the kinetic energy which the dust 34 has before the collision is converted into distortion energy dependent upon the deformation of the fixing flange of the diaphragm 8 at the time of the collision. The distortion energy is the area 36 indicated by the hatched portion in FIG. 9 in which P-δ curves which exhibit the relationship the load and displacement are shown (the hatched portion 36 defined by the downside of the P-δ curve 35 indicates an example of the distortion energy in the prior art device). If the angle of a taper is larger, it is more difficult for the taper portion to deform.

Therefore, the inclination of the curve 35 which indicates the example of the P-δ curve in the prior art device is large. With the area of the portion 36 on the downside of the P-δ curve 35 being constant, when the inclination of the P-δ curve is increased, the value of the maximum load P1 results in a large value. The destructive boundary load of the membrane is the level 37 in FIG. 9, and in this case, the diaphragm 8 cannot stand the load which is generated on the diaphragm 8, whereby the destruction occurs.

Figure 8:
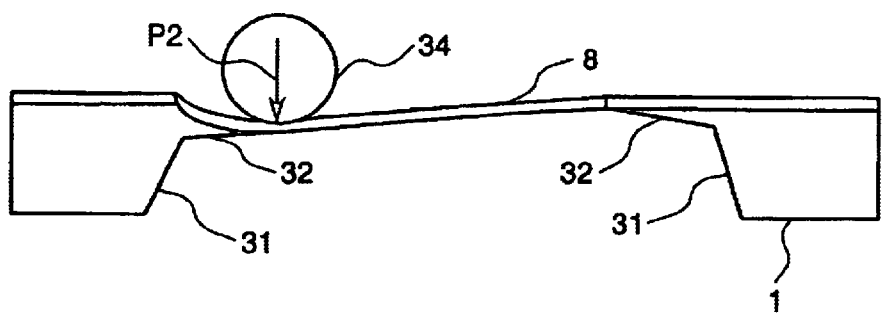
FIG. 8 shows the state in which dust collided with the sensor chip of the device of one embodiment of this invention.

On the contrary, in this embodiment, as shown in FIG. 8, 10 at the position of the fixing flange of the diaphragm 8, there is the two-stage taper structure consisting of the tapers 31 and 32. Since the angle of the inside taper 32 is smaller than the angle of the outside taper 31, with a slight load a large bending occurs, and the slope of the P-δ curve becomes small, as shown by 38 in FIG. 9. Therefore, as shown in FIG. 8, it is possible to make the generated load P2 small even when the dust 34 collides with the vicinity of the edge of the diaphragm 8. Accordingly, it is possible to prevent the damage or destruction of the diaphragm 8.

In the case where dust collides with the base or root of the inside taper 32, the generated load becomes large because the degree of deflection is small at this position. However, this portion which is the root of the taper has sufficient thickness to provide for a large destructive load so that the destruction of the diaphragm can be prevented. In the case where the dust collides with the center of the diaphragm, the diaphragm, per se deforms in a large way, and kinetic energy at the time of the collision is absorbed. Therefore, the generated load becomes smaller, and no destruction occurs.

It was found from the examination of the dust that reaches the sensor part under various conditions that the size of the dust is usually under 100 μm. Under this conditioned size, the requirement that the diaphragm 8 is not destroyed was evaluated. As a result, it was found that the angle è of the inside taper 32 shown in FIG. 1 needs to be under 15 degrees, preferably under 5 degrees, and the thickness h of the base or root of this taper needs to be above 12 μm, preferably 30 μm.

Also, in such a structure, it is possible to support the diaphragm so that the length 1 from the taper root portion to the taper head portion is within ½ of the distance from the taper root portion to the center of the diaphragm.

As explained above, in the heated type air flow rate sensor in which the diaphragm fixing flange for fixing the diaphragm is formed and the air flow rate is measured by attaching the heat generating resistor to the diaphragm and using the electric resistance value, the flexible support portion is installed with the diaphragm fixing portion of said diaphragm fixing flange, the taper formation is shaped to extend from the taper root portion of said flexible support portion, said flexible support portion has the taper formation having an angle of within 15 degrees, the taper root portion is made to be over 12 μm, and the buckling shape is formed by the two taper formations.

Also, a heated type air flow rate sensor is provided in which the diaphragm fixing portion has the member for supporting the diaphragm having a taper configuration with an angle which is within 15 degrees. This supportive member thinned toward the heat generating resistor in a tapered way.

Also, a heated type air flow rate sensor is provided in which the diaphragm fixing flange has a support member providing a taper configuration in which the length from the taper root portion to the head is within ½ of the distance between the taper root portion and the center of the diaphragm.

In the structure of the prior art device shown in FIG. 7, if the taper angle is forcibly made smaller, the substrate 1 must be made to be extremely thin. Therefore, it is impossible to effect the handling of the chip, which precludes production. Also, in the case where the taper angle is large, it would be expected that the extremely thickened diaphragm 8 could avoid the destruction. However, with such a thick diaphragm 8, the heat generated in the resistive element that is within the diaphragm 8 is easily transmitted to the fixing portion of the substrate 1, and, therefore, the temperature change of the resistor due to the flow of air which is the measurement object, is lost and it becomes impossible to measure the air flow rate. On the grounds of this, the diaphragm cannot be thickened.

FIG. 5 shows an arrangement in which the embodiment of this invention is applied to an automobile. The air flow rate in the intake pipe 21 of an automobile internal combustion engine is measured using the above mentioned sensor 11. A control unit 27 calculates an appropriate fuel injection timing and its amount on the basis of the control signal generated, a signal generated on the basis thereof is transmitted to a fuel injection device 28, and the fuel injection is carried out in the fuel injection device 28. In this embodiment, since a sensor of high precision and without deterioration is used, it is possible to maintain control of the fuel injection with high precision over the long term and provide a saving of the amount of fuel consumption and a decrease in the amount of discharge of air pollutants.

Figure 10A:
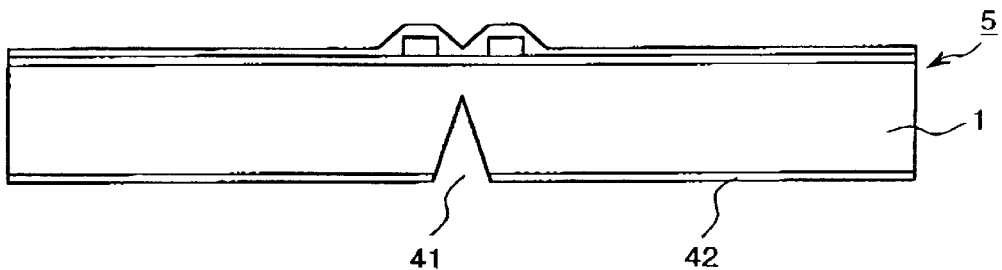
FIG. 10 shows the processes for treating a substrate of one embodiment of this invention.
Figure 10B:
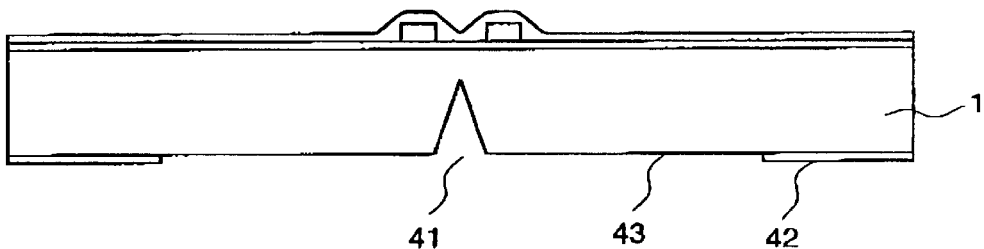
Figure 10C:
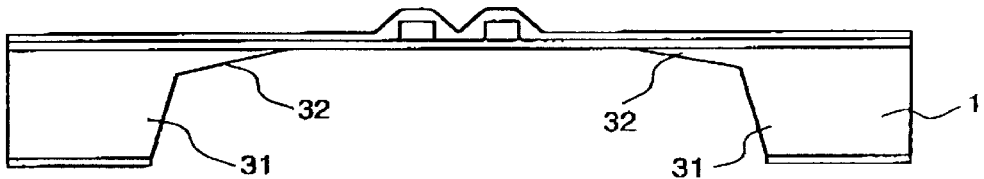

A method of forming the taper configuration in this embodiment using FIG. 10 is described below. The Si monocrystal of the (100) face is used and a KOH aqueous solution is used for etching. First, as shown in FIG. 10(a), a depression 41 which is smaller than the final depression is first formed by a usual anisotropic etching method. Next, as shown in FIG. 10(b), a portion 43 surrounding the depression 41 in the mask 42 of the back face 42 is removed. Further, under this condition, by effecting the etching during an appropriate period of time, a two-stage taper configuration is formed at the diaphragm fixing flange position as shown in FIG. 10(c), using such a nature that the etching speed varies depending upon crystal orientation. At this time, it was found that the angle of the inside taper 32 can be formed to be smaller than the angle of the outside taper 31. It was also found from the measurement of the angle of the inside taper 32 that it can be formed to be under 5 degrees. Incidentally, it was found that the angle of the outside taper 31 is formed to be 55 degrees. By effecting such a formation, it was found that with the thickness of the substrate being held appropriately, it is possible to make the angle of the inside taper small and to prevent the damage of the diaphragm due to the collision of dust.

Figure 11:
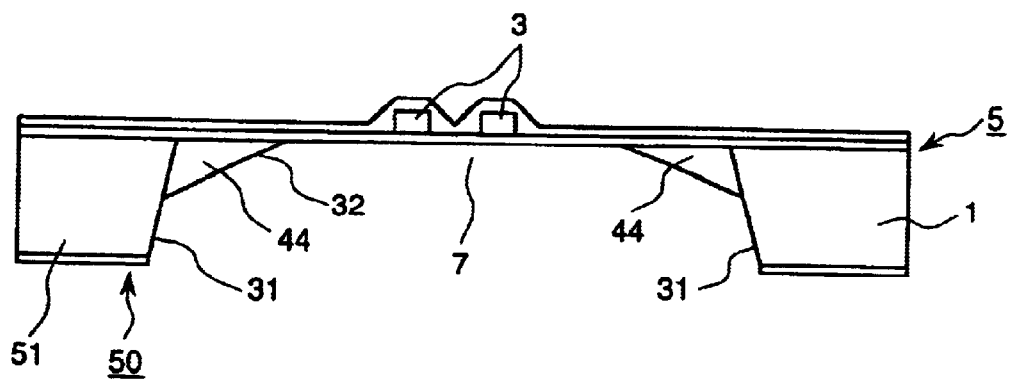
FIG. 11 shows the cross section of a sensor chip of another embodiment of this invention.

FIG. 11 shows another embodiment of this invention. In the above-mentioned embodiment, the diaphragm fixing flange, especially the flexible support portion 52 thereof, was formed by the Si monocrystal, whereas in this embodiment, a flexible support portion 44 is made of a resin. The resinic flexible support portion 44 can be formed as follows: The diaphragm is formed in a usual method, then a resin before hardening is applied to the edge portion of the back face of the diaphragm, and thereafter, heat hardening is carried out. Since the resin is smaller in Young's modulus than the Si monocrystal, using the resin can provide the appropriate deformation absorption capability even though the taper angle is made to be large. Accordingly, as compared to the case of the Si monocrystal which needs the precise control of the taper angle, it is easy to form the shape for the material of the resin, polyimide may be used since it provides good heat resistance. In the case where the polyimide was used, it was found that by making the taper angle less than 11 degrees, for example, it is possible to provide a sufficient capability for resisting dust. Resist material may be used. However, the thickness of the root of the resinic flexible support portion preferably needs to be made over 40 $\mu$m. On the other hand, as in the above-mentioned embodiment, the advantage when the Si monocrystal is used for the inside taper is that it enables the saving of material since there is no need to apply the resin.

As mentioned above, in the heated type air flow rate sensor in which the diaphragm fixing flange for fixing the diaphragm is formed and the air flow rate is measured by attaching the heat generating resistor to the diaphragm and using the electric resistance value, said diaphragm is supported by the flexible support portion, which is thinned toward said resistor in a taper way and is integrated with the diaphragm fixing portion of said diaphragm fixing flange. The flexible support portion is made of a resin.

In accordance with the apparatus of this invention, by reducing the force applied to the sensor diaphragm due to the collision of dust, it is possible to prevent the destruction of the diaphragm and the deterioration of the sensor characteristics. Furthermore, in accordance with the apparatus of this invention, since it provides good control accuracy for an automobile internal combustion engine, the result is that the amount of fuel consumption is reduced and the amount of discharge of air pollutants is decreased.

What is claimed is:

1. A heated type air flow rate sensor comprising:

a diaphragm fixing flange for fixing a diaphragm; and a heat generating resistive element mounted to the diaphragm, so that the air flow rate is measured using an electric resistance value, wherein said diaphragm is supported by a flexible support portion thinned toward said heat generating resistive element in a tapered way and integrated with a diaphragm fixing portion of said diaphragm fixing flange, wherein said flexible support portion is formed in the form of the shape having a taper of which angle is within 15 degrees.

2. A heated type air flow rate sensor comprising:

a diaphragm fixing flange for fixing a diaphragm; and a heat generating resistive element mounted to the diaphragm, so that the air flow rate is measured using an electric resistance value, wherein said diaphragm is supported by a flexible support portion thinned toward said heat generating resistive element in a tapered way and integrated with a diaphragm fixing portion of said diaphragm fixing flange, wherein said flexible support portion is formed in the form of the shape having a taper of which angle is within 5 degrees.

3. A heated type air flow rate sensor comprising:

a diaphragm fixing flange for fixing a diaphragm; and a heat generating resistive element mounted to the diaphragm, so that the air flow rate is measured using an electric resistance value, wherein said diaphragm is supported by a flexible support portion thinned toward said heat generating resistive element in a tapered way and integrated with a diaphragm fixing portion of said diaphragm fixing flange, wherein said diaphragm fixing portion has a taper shape formed from the tapered root portion of said flexible support portion, and the tapered taper angle of said flexible support portion is made smaller than the tapered taper angle of said diaphragm fixing portion.

4. A heated type air flow rate sensor according to claim 3, wherein said flexible support extends from said diaphragm fixing edge under a surface of said diaphragm opposite a surface mounting said resistive element.

5. A heated type air flow rate sensor comprising:

a diaphragm fixing flange for fixing a diaphragm; and a heat generating resistive element mounted to the diaphragm, so that the air flow rate is measured using an electric resistance value, wherein said diaphragm is supported by a flexible support portion thinned toward said heat generating resistive element in a tapered way and integrated with a diaphragm fixing portion of said diaphragm fixing flange, wherein the length from the tapered root portion of said flexible support portion to the head is made within ½ of the distance between the tapered root portion and the center of the diaphragm.

6. A heated type air flow rate sensor according to claim 5 wherein said flexible support extends from said diaphragm fixing edge under a surface of said diaphragm opposite a surface mounting said resistive element.

7. A heated type air flow rate sensor comprising:

a diaphragm fixing flange for fixing a diaphragm; and a heat generating resistive element mounted to the diaphragm, so that the air flow rate is measured using an electric resistance value, wherein said diaphragm is supported by a flexible support portion thinned toward said heat generating resistive element in a tapered way and integrated with a diaphragm fixing portion of said diaphragm fixing flange, wherein said flexible support portion is comprised of a resin, and wherein said flexible support portion is formed in the form of a shape which continuously uniformly tapers from a point where it contacts said diaphragm fixing portion of said diaphragm fixing flange to a point where the flexible support portion contacts the diaphragm closest to the center of the diaphragm.

8. A heated type air flow rate sensor according to claim 7, wherein it is used in an automobile internal combustion engine controlling apparatus.

9. A heated type air flow rate sensor according to claim 7 wherein said diaphragm fixing flange is thicker than said flexible support portion.

10. A heated type air flow rate sensor according to claim 7 wherein said flexible support portion extends from said diaphragm fixing portion of said diaphragm fixing flange under a surface of said diaphragm opposite a surface of the diaphragm on which the heat generating resistive element is mounted.

11. A heated type air flow rate sensor according to claim 10, further comprising means for absorbing shock comprising a flexible support extending from said diaphragm fixing portion under a surface of said diaphragm opposite a surface mounting said resistive element.

12. A heated type air flow rate sensor according to claim 7, wherein said diaphragm fixing portion of said diaphragm fixing flange is comprised of Si.

13. A heated type air flow rate sensor comprising:

a diaphragm fixing flange for fixing a diaphragm; and a heat generating resistive element mounted to the diaphragm, so that the air flow rate is measured using an electric resistance value, wherein a flexible support portion is setup to a diaphragm fixing portion of said diaphragm fixing flange and a taper shape is formed from the root portion of said flexible support portion, wherein said flexible support portion has a tapered shape of which angle is within 15 degrees, and the taper root portion is made above 12 $\mu$m, and wherein the angle of the taper shape of said diaphragm fixing portion is made above 15 degrees, and a buckling shape is formed by the two taper shapes.

14. A heated type air flow rate sensor comprising:

a diaphragm fixing flange for fixing a diaphragm; and a heat generating resistive element mounted to the diaphragm, so that the air flow rate is measured using an electric resistance value, wherein said diaphragm fixing flange has a member for supporting said diaphragm, said member having a taper shape of which angle is within 15 degrees, said taper shape being thinned forward said heat generating resistive element in a tapered way.

15. A heated type air flow rate sensor comprising:

a diaphragm fixing flange for fixing a diaphragm; and a heat generating resistive element mounted to the diaphragm, so that the air flow rate is measured using an electric resistance value, wherein said diaphragm fixing flange has a taper shape of which length from the taper root portion to the taper head is within ½ of the distance between the taper root portion and the center of the diaphragm.

16. A heated type air flow rate sensor comprising:

a resistive element heated by a current;

a diaphragm mounting said resistive element;

a diaphragm fixing portion coupled to fix said diaphragm; and means coupled between said diaphragm fixing portion and said diaphragm for absorbing shock induced in the diaphragm by particles striking the diaphragm, wherein the length from the tapered root portion of said flexible support portion to the head is made within ½ of the distance between the tapered root portion and the center of the diaphragm.

* * * * *